United States Patent
Yamamoto et al.

(10) Patent No.: US 6,620,509 B1
(45) Date of Patent: Sep. 16, 2003

(54) TRANSPARENT RESIN LAMINATE AND MOLDED ARTICLE USED THE SAME

(75) Inventors: Takaichi Yamamoto, Ono (JP); Takeshi Kimura, Ono (JP); Seiji Sugimori, Ono (JP)

(73) Assignees: Mitsubishi Gas Chemical Company, Inc., Tokyo (JP); Ipposha Oil Industries Co., Ltd., Hyogo (JP)

( * ) Notice: Subject to any disclaimer, the term of this patent is extended or adjusted under 35 U.S.C. 154(b) by 0 days.

(21) Appl. No.: 10/150,160

(22) Filed: May 20, 2002

(30) Foreign Application Priority Data

Apr. 22, 2002 (JP) .......................................... 2002-119243

(51) Int. Cl.$^7$ ................................................ B32B 27/36
(52) U.S. Cl. ........................ 428/412; 359/273; 359/274; 359/275; 428/426; 428/428; 428/429; 528/196; 528/198
(58) Field of Search .................................. 428/412, 426, 428/428, 429; 528/196, 198; 359/273, 274, 275

(56) References Cited

U.S. PATENT DOCUMENTS 5,409,778 A    4/1995   Patel 6,306,512 B1   10/2001  Bier

FOREIGN PATENT DOCUMENTS

| EP | 2001-139924 | 5/2001 |
|---|---|---|
| EP | 1 174 260 A2 | 1/2002 |
| JP | 8-230127 | 9/1996 |
| JP | 9-174783 | 7/1997 |
| JP | 2-182764 | 7/1999 |

*Primary Examiner*—Terressa M. Boykin
(74) *Attorney, Agent, or Firm*—Sughrue Mion, PLLC

(57) ABSTRACT

A transparent resin laminate comprising a polycarbonate resin base material, an acrylic resin layer comprising an ultraviolet absorbent coated on at least one surface of said polycarbonate resin base material and a cured layer formed by coating a composition comprising polyorganosiloxane and a silicone-containing polymer ultraviolet absorbent on said acrylic resin layer and then curing, wherein a difference of linear expansion coefficient between said polycarbonate resin base material and said acrylic resin layer and a difference of linear expansion coefficient between said acrylic resin layer and said cured layer are 0/° C. to $5 \times 10^{-5}$/° C., respectively and a molded article used the same.

15 Claims, No Drawings

TRANSPARENT RESIN LAMINATE AND MOLDED ARTICLE USED THE SAME

BACKGROUND OF THE INVENTION

1) Field of the Invention

The present invention relates to a transparent resin laminate and a molded article used the same, and particularly to a transparent resin laminate with good adhesion between each resin layer, excellent in weather resistance, abrasion resistance, heat resistance and water resistance comprising polycarbonate resin base material/acrylic resin layer/cured layer and a molded article used the same. The transparent resin laminate and the molded article is applicable to the fields of windows, sun roofs and lamp covers for car, transparent roofs and dormer windows such as hothouse, soundproof walls, signboards, front boards of automatic selling machine, carports, optical materials such as spectacle lens and camera lens, guard sheets for indication of LCD and EL and membranes shielding oxygen and moisture.

2) Prior Art

Transparent organic plastic materials, particularly, a polycarbonate resin is applicable to various uses as optical materials because it is excellent in impact resistance, dimension stability, molding and fire self-extinguishing and has a high heat distortion temperature. However, they cause a problem that transparency of the most important property as a transparent material is impaired because surface hardness is low and abrasion resistance is poor.

Further, other transparent plastic materials, e.g., polymethylmethacrylate, polystyrene and polyvinyl chloride are applicable to various uses since they are excellent in transparency, light weight, easy molding and impact strength. However, molded articles also obtained from these materials cause problems that abrasion resistance, chemical resistance and solvent resistance are poorer than other materials and their surfaces are easily hurt.

In order to solve the above-mentioned problems, a polyorganosiloxane resin has been used as a coating to improve surface hardness and abrasion resistance of plastic molded articles such as a polycarbonate resin and an acrylic resin (Japanese Patent Kokai (Laid-open) No. 2-182764, 8-230127, 9-174783, 55-59929 and 58-107316).

However, when transparent plastics coated with a polyorganosiloxane resin are used outdoors, for example, in windows, sun roofs and lamp covers for car and vehicle, transparent roofs and dormer windows such as hothouse, spectacle lens and camera lens, coatings with performances capable of resisting to severe outdoor environments such as sunlight, rain, a humidity, a temperature difference between a high temperature and a low temperature are not yet sufficient in the present situation.

SUMMARY OF THE INVENTION

An object of the present invention is to solve the above-mentioned prior art problems and to provide a transparent resin laminate with good adhesion between each resin layer, excellent in weather resistance, abrasion resistance, heat resistance and water resistance and a molded article used the same.

As a result to solve the above-mentioned prior art problems, the inventors have found that a transparent resin laminate and a molded article used the same with good adhesion between each resin layer, excellent in weather resistance, abrasion resistance, heat resistance and water resistance and a molded article used the same can be obtained by using a resin laminate comprising an acrylic resin layer comprising an ultraviolet absorbent coated on at least one surface of a polycarbonate resin base material and a cured layer formed by coating a composition comprising polyorganosiloxane and specific ultraviolet absorbent in which a difference of linear expansion coefficient between each resin layer is made small, and have accomplished the present invention.

That is, the present invention provides a transparent resin laminate comprising a polycarbonate resin base material, an acrylic resin layer comprising an ultraviolet absorbent coated on at least one surface of said polycarbonate resin base material and a cured layer formed by coating a composition comprising polyorganosiloxane and a silicone-containing polymer ultraviolet absorbent on said acrylic resin layer and then curing, wherein a difference of linear expansion coefficient between said polycarbonate resin base material and said acrylic resin layer and a difference of linear expansion coefficient between said acrylic resin layer and said cured layer are $0/°$ C. to $5 \times 10^{-5}/°$ C. respectively.

Further, the present invention provides a mold article for window glass and sun roof of car obtained by inserting the above-mentioned transparent resin laminate into a mold of an injection molder and injecting another polycarbonate resin to its polycarbonate resin base material side and then injection molding to integrate.

The present invention provides a molded article for window glass and sun roof of car obtained by bending the above-mentioned transparent resin laminate.

DETAILED DESCRIPTION OF THE INVENTION

The present invention will be described in detail below.

The transparent resin laminate comprises polycarbonate resin base material/acrylic resin layer/cured layer.

It is preferable that the polycarbonate resin base material has a weight average molecular weight of 24000 to 53000. In the above-mentioned range of weight average molecular weight, its linear expansion coefficient is in the range of $6 \times 10^{-5}/°$ C. to $8 \times 10^{-5}/°$ C. The larger the weight average molecular weight of the polycarbonate resin is, the larger the linear expansion coefficient of the polycarbonate resin becomes.

The form of the polycarbonate resin material is a molded article, a film, a sheet or a board.

The cured layer is formed by coating a composition comprising a silicone-containing polyorganosiloxane and a polymer ultraviolet (hereinafter, "UV") absorbent on the acrylic resin.

It is preferable that the polyorganosiloxane is a hydrolyzate and/or a partial condensed product obtained by hydrolysis and condensation of organosilane represented by the general formula $R^1{}_n Si(OR^2)_{4-n}$ wherein n is an integer of 0 to 2 and it is a heat curing type.

$R^1$ in the organosilane is an organic group having 1 to 8 carbon atoms. Examples of $R^1$ include alkyl groups such as methyl group, ethyl group, n-propyl group, n-butyl group, i-butyl group, sec-butyl group, n-hexyl group and n-heptyl group, γ-chloropropyl group, vinyl group, 3,3,3-trifluoropropyl group, glycidoxypropyl group, γ-methacryloxypropyl group, γ-mercaptopropyl group, phenyl group and 3,4-epoxycyclohexylethyl group. $R^2$ in the organosilane is an alkyl group having 1 to 5 carbon atoms or an acyl group having 1 to 4 carbon atoms. Examples of $R^2$ include methyl group, ethyl group, n-propyl group, n-butyl group, i-butyl group, sec-butyl group, tert-butyl group, acetyl group, propionyl group and butyryl group.

Examples of the organosilane include tetramethoxysilane, tetraethoxysilane, methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, γ-chloropropyltrimethoxysilane, γ-chloropropylethoxysilane, vinyltrimethoxysilane, vinyltriethoxysilane 3,3,3-trifluoropropyltrimethoxysilane, 3,3,3-trifluoropropyltriethoxysilane, γ-glycidoxypropyltrimethoxysilane, γ-glycidoxypropyltriethoxysilane, γ-methacryloxypropyltrimethoxysilane, γ-methacryloxypropytriethoxysilane, γ-mercaptopropyltrimethoxysilane, γ-mercaptopropyltriethoxysilane, phenyl trimethoxysilane, phenyltriethoxysilane, 3,4-epoxycyclohexylethyltrimethoxysilane, 3,4-epoxycyclohexylethyltriethoxysilane, dimethyldimethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, diphenyldimethoxysilane and diphenyldiethoxysilane, among which tetramethoxysilane, tetraethoxysilane, methyltrimethoxysilane, methyltriethoxysilane, dimethyldimethoxysilane and dimethyldiethoxysilane are preferable.

The organosilane can be used alone or in the combination of two species or more. Further, preferably 40 mol % or above and more preferably 50 mol % or above of the above-mentioned organosilane is $CH_3Si(OR^2)_3$.

The organosilanes are hydrolyzed and condensed with a prescribed amount of water to change to oligomers. The organosilane monomer is about consumed and not present in the reaction system. Then, the reaction is further advanced so as to produce polyorganosiloxane substantially non-containing monomer and dimer and containing 65% by weight or above of hexamer or more and having a number average polymerization degree of 8 to 30.

When polyorganosiloxane thus obtained by the reaction substantially contains neither monomer nor dimer and contains 65% by weight or above of hexamer or more and has a number average polymerization degree of 8 to 30, the linear expansion coefficient of the cured layer formed by curing the polyorganosiloxane having said number average polymerization degree is in the range of $7 \times 10^{-5}/°$ C. to $15 \times 10^{-5}/°$ C. In the range of 65% by weight or above of hexamer or more and 8 to 30 of number average polymerization degree, the larger the content of hexamer or more or the number average polymerization degree is, the larger the linear expansion coefficient of the polyorganosiloxane becomes. It is possible to make small the difference of linear expansion coefficient between acrylic resin layer and cured layer so as to satisfy the range of linear expansion coefficient in the present invention considering the above-mentioned regard.

In the above-mentioned reaction, the reaction temperature is usually 25 to 70° C., preferably 30 to 60° C. and more preferably 30 to 50° C. The post stage reaction is gradually advanced. When the reaction temperature is below 25° C., it is not preferable since it takes along time to obtain intended oligomer components, whereas above 70° C. it is not preferable since cross-link reaction sometimes occurs.

The hydrolysis of organosilane to obtain polyorganosiloxane to be used in the present invention can be performed by conventional processes. It is preferable to perform it in the presence of water containing an acidic hydrolysable catalyst. The catalyst for the above-mentioned hydrolysis can be selected from known catalysts to indicate an acidity of pH 2 to 5. For example, it is preferable to use acidic hydrogen halide, carboxylic acid and sulfonic acid, acidic or weak acidic inorganic salts or solid acids such as ion exchange resin.

Examples of the catalyst for hydrolysis include inorganic acids including, typically, hydrogen fluoride, hydrochloric acid, nitric acid, sulfuric acid, organic acids such as acetic acid and maleic acid, methyl sulfonic acid and a cation exchange resin having sulfonic acid group or carboxylic acid group on its surface. The amount of the catalyst for hydrolysis may be properly adjusted depending on various uses. In the present invention, it is preferable that it is in the range of 0.001 to 5 mol % to alkoxysilane.

A buffer solution to adjust pH including combinations of acid and basic compound such as a combination of acetic acid and sodium acetate and a combination of disodium hydrogenphosphate and citric acid, a dispersion solvent or an organic resin, a pigment, a dye, a leveling agent, UV absorbent and preservation stabilizer to provide excellent coating performances may be properly added.

In the composition comprising polyorganosiloxane in the present invention, a silicone-containing polymer UV absorbent is further contained. The silicone-containing polymer UV absorbent is a polymer obtained from (A) at least one UV absorbing monomer selected from the group consisting of benzophenone UV absorbing monomers represented by the following formula (1) and benzotriazole UV absorbing monomers represented by the following formula (2), (B) silicone macromer represented by the following formula (3), (C) functional group-containing copolymerizable vinyl monomer and (D) functional group non-containing copolymerizable vinyl compound and has a weight average molecular weight of 10,000 to 100,000;

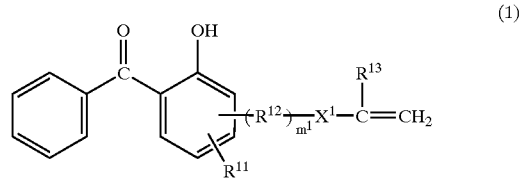

(1)

wherein $R^{11}$ is a hydrogen atom, an alkyl group having 1 to 6 carbon atoms or an alkoxy group having 1 to 6 carbon atoms; $R^{12}$ is an alkylene group having 1 to 10 carbon atoms or an oxyalkylene group having 1 to 10 carbon atoms and $m^1$ is 0 or 1; $R^{13}$ is a hydrogen atom or a low alkyl group and $X^1$ is an ester bond, an amide bond, an ether bond or an urethane bond;

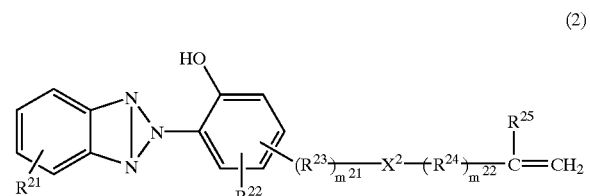

(2)

wherein $R^{21}$ is a hydrogen atom, a halogen atom or a methyl group; $R^{22}$ is a hydrogen atom or a hydrocarbon group having 1 to 6 carbon atoms; $R^{23}$ is an alkylene group having 1 to 10 carbon atoms or an oxyalkylene group having 1 to 10 carbon atoms and $m^{21}$ is 0 or 1; $R^{24}$ is an alkylene group having 1 to 8 carbon atoms or an alkylene group with an amino group having 1 to 8 carbon atoms or an alkylene group with a hydroxyl group having 1 to 8 carbon atoms and $m^{22}$ is 0 or 1; $R^{25}$ is a hydrogen atom or a low alkyl group and $X^2$ is an ester bond, an amide bond, an ether bond or an urethane bond;

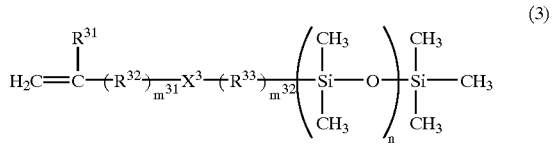

(3)

wherein $R^{31}$ is a hydrogen atom or a methyl group; $R^{32}$ is an alkylene group having 1 to 6 carbon atoms or an oxyalkylene group having 1 to 6 carbon atoms and $m^{31}$ is 0 or 1; $R^{33}$ is an alkylene group having 1 to 6 carbon atoms, an alkylene group with an amino group having 1 to 6 carbon atoms or an alkylene group with a hydroxyl group having 1 to 6 carbon atoms and $m^{32}$ is 0 or 1 and n is an integer of 1 to 200 and $X^3$ is an ester bond or an amide bond.

In the present invention, it is preferable that a weight average molecular weight of (B) silicone macromer is 200 to 10,000.

In the present invention, each proportion of (A) ultraviolet absorbing monomer, (B) silicone macromer, (C) functional group-containing compolymerizable vinyl monomer and (D) functional group non-containing copolymerizable vinyl compound to total amount of components (A), (B), (C) and (D) is preferably (A)/(B)/(C)/(D)=5 to 50/5 to 60/50 to 80/5 to 20 (% by weight) and more preferably 10 to 30/10 to 30/60 to 70/10 to 15 (% by weight).

Examples of alkyl group having 1 to 6 carbon atoms ($R^{11}$) in the formula (1) include methyl group, ethyl group, propyl group, isopropyl group, butyl group, s-butyl group, t-butyl group, pentyl group and hexyl group, among which an alkyl group having 1 to 4 carbon atoms is preferable and an alkyl group having 1 to 2 carbon atoms is more preferable. Examples of alkoxyl group having 1 to 6 carbon atoms ($R^{11}$) include methoxy group, ethoxy group, propoxy group and butoxy group, among which an alkoxyl group having 1 to 4 carbon atoms is preferable and an alkoxyl group having 1 to 2 carbon atoms is more preferable.

$R^{11}$ may be substituted in any position of a hydroxyl group-substituted benzene ring. Preferable substitution position is 3-site or 5-site.

Examples of alkylene group having 1 to 10 carbon atoms ($R^{12}$, $R^{23}$) in formula (1) and/or formula (2) include methylene group, ethylene group, trimethylene group, propylene group, tetramethylene group, pentamethylene group, hexamethylene group, octamethylene group and decamethylene group, among which an alkylene group having 1 to 6 carbon atoms is preferable and an alkylene group having 1 to 4 carbon atoms is more preferable. Examples of oxyalkylene group having 1 to 10 carbon atoms ($R^{12}$, $R^{23}$) include oxymethylene group, oxyethylene group and oxypropylene group.

$R^{12}$ may be substituted in any position of a hydroxyl group-substituted benzene ring. Preferable substitution position of $R^{12}$ is 4-site or 5-site and more preferably 4-site.

$R^{23}$ may be substituted in any position of a hydroxyl group-substituted benzene ring. Preferable substitution position of $R^{23}$ is 5-site.

Examples of low alkyl group ($R^{13}$ and $R^{25}$) include an alkyl group having 1 to 4 carbon atoms.

Examples of halogen atom ($R^{21}$) include a fluorine atom, a chlorine atom and a bromine atom, among which a chlorine atom is preferable. When $R^{21}$ is a halogen atom or a methyl group, $R^{21}$ may be substituted in any position of benzene ring. Preferable $R^{21}$ is a hydrogen atom.

In hydrocarbon group having 1 to 6 carbon atoms ($R^{22}$), an alkyl group is preferable. Examples of such alkyl group include the above-exemplified alkyl group having 1 to 6 carbon atoms. $R^{22}$ may be substituted in any position of a hydroxyl group-substituted benzene ring. Preferable substitution position of $R^{22}$ is 3-site.

Examples of an alkylene group having 1 to 8 carbon atoms ($R^{24}$) include the above-exemplified alkylene group having 1 to 8 carbon atoms, among which an alkylene group having 1 to 4 carbon atoms is preferable and an alkylene group having 1 to 2 carbon atoms is more preferable. Examples of an alkylene group with an amino group having 1 to 8 carbon atoms or an alkylene group with a hydroxyl group having 1 to 8 carbon atoms include the above-exemplified alkylene group with an amino group or a hydroxyl group.

Examples of $X^1$ and $X^2$ include —COO—, —OCO—, —NHCO—, —CONH—, —O—, —NHCOO— and —COONH—.

$m^1$, $m^{21}$ and $m^{22}$ are 0 or 1. For example, when $m^1$ is 0, $X^1$ means to bond directly to a hydroxyl group-substituted benzene ring not through $R^{12}$. That is, when $m^1$, $m^{21}$ or $m^{22}$ is 0, $R^{11}$, $R^{23}$ or $R^{24}$ is not present. When $m^1$, $m^{21}$ or $m^{22}$ is 1, $R^{11}$, $R^{23}$ or $R^{24}$ is present. For example, when $m^1$ is 1, $X^1$ means to bond to $R^{12}$.

Examples of the benzophenone UV absorbing monomer represented by the above-mentioned formula (1) include 2-hydroxy-4-acryloyloxybenzohenone, 2-hydroxy-4-methacryloyloxybenzophenone, 2-hydroxy-4-(2-acryloyloxy)ethoxybenzophenone, 2-hydroxy-4-(2-methacryloyloxy)ethoxybenzophenone and 2-hydroxy-4-(2-methyl-2-acryloyloxy)ethoxybenzophenone.

Examples of benzotriazoles UV absorbing monomer represented by the above-mentioned formula (2) includes 2-[2'-hydroxy-5'-(methacryloyloxy)phenyl]benzotriazole, 2-[2'-hydroxy-5'-(acryloyloxy)phenyl]benzotriazole, 2-[2'-hydroxy-3'-t-butyl-5'-(methacryloyloxy)phenyl]benzotriazole, 2-[2'-hydroxy-3'-methyl-5'-(acryloyloxy)phenyl]benzotriazole, 2-[2'-hydroxy-5'-(methacryloyloxypropyl)-5-chlorobenzotriazole, 2-[2'-hydroxy-5'-(methacryloyloxyethyl)phenyl]benzotriazole, 2-[2'-hydroxy-5'-(acryloyloxyethyl) phenyl]benzotriazole, 2-[2'-hydroxy-3'-t-butyl-5'-(methacryloyloxyethyl)phenyl]benzotriazole, 2-[2'-hydroxy-3'-methyl-5'-(acryloyloxyethyl)phenyl]benzotriazole, 2-[2'-hydroxy-5'-(acryloyloxybutyl)-phenyl]-5-methylbenzotrazole and [2-hydroxy-3-t-butyl-5-(acryloyloxyethoxycarbonylethyl)phenyl]benzotrazole (A) UV absorbing monomer can be prepared by reacting an UV absorbing compound with a functional group(s) such as hydroxyl group, carboxyl group and amino group having 2-hydroxybenzophenone skeleton or 2-hydroxybenzotriazole skeleton with a copolymerizable vinyl compound such as acrylic acid and methacrylic acid to form a bond(s) such as an ester bond, an amide bond, an ether bond and an urethane bond.

(B) Silicone macromer is a silicone component-containing vinyl compound represented by the formula (3). Examples of an alkylene group having 1 to 6 carbon atoms ($R^{32}$) or an oxyalkylene group having 1 to 6 carbon atoms ($R^{32}$) in the formula (3) include the above-exemplified alkylene group or oxy alkylene group having 1 to 6 carbon atoms.

Examples of an alkylene group having 1 to 6 carbon atoms ($R^{33}$) include the above-exemplified alkylene group having 1 to 6 carbon atoms, among which an alkylene group having 1 to 4 carbon atoms is preferable and an alkylene group 1 to 2 carbon atoms is more preferable. Examples of an alkylene group with an amino group having 1 to 6 carbon atoms or an alkylene group with a hydroxyl group having 1 to 6 carbon atoms include the above-exemplified amino group-or hydroxyl group-substituted alkylene group.

$m^{31}$ and $m^{32}$ are 0 or 1. n is an integer of 1 to 200 which shows a repeating number of silicone component or its polymerization degree.

Examples of $X^3$ include —COO—, —OCO—, —NHCO—, and —CONH.

Examples of (B) silicone marcomer include 1-(3-methacryloxypropyl)polydimethylsiloxane, 3-methacryloxypropylpolydimethylsiloxane and polydimethylsiloxane methacrylamide. Examples of commercial (B) silicone macromer include Trade name "Sailaprene FM-0721" and "Sailaprene FM-0725", each manufactured by Chisso Corpration in Japan.

The process for preparing (B) silicone macromer is not limited. For example, (B) silicone macromer can be prepared by esterification reaction of 1-(3-hydroxylpropyl)polydimethylsiloxane and acrylic acid or methacrylic acid, or by reaction of 2-hydroxyethylacrylate and 1-(3-glycidoxypropyl)polydimethylsiloxane.

The weight average molecular weight of (B) silicone macromer is not limited. It is preferable that it is 200 to 10,000 from the viewpoint of compatibility of silicone-containing polymer UV absorbent with a resin. Therefore, it is preferable that n of the formula (3) is about 1 to 130. It is more preferable that the weight average molecular weight of (B) silicone macromer is 500 to 5,000.

The (B) silicone macromer can be used alone or in the combination of two species or more.

The (C) functional group-containing copolymerizable vinyl monomer means a vinyl compound with a functional group(s) such as carboxyl group and hydroxyl group. The (C) functional group-containing copolymerizable vinyl compound is not limited and its examples include acrylic acid, methacrylic acid, maleic anhydride, 2-hydroxyethylacrylate, 2-hydroxylethylmethacrylate and diethyleneglycol monomethacrylate and can be used alone or in the combination of two species or more.

The (D) functional group non-containing copolymerizable vinyl compound means a vinyl compound having no functional group such as carboxyl group and hydroxyl group. In the present invention, a copolymerizable vinyl compound having a functional group(s) in copolymerizable vinyl compounds is included in (C) functional group-containing copolymerizable vinyl monomer and a copolymerizable vinyl compound having no functional group is included in (D) functional group non-containing copolymerizable vinyl compound. The (D) functional group non-containing copolymerizable vinyl compound can be used alone or in the combination of two species or more.

The (D) functional group-non containing is not limited and its examples include acrylate, methacrylate, alkyl vinyl ether, alkyl vinyl ester and styrene.

In more detail, examples of acrylate or methacrylate include $C_{1-8}$ alkyl acrylates such as methyl acrylate, ethyl acrylate, butyl acrylate, 2-ethylhexyl acrylate, octyl acrylate, lauryl acrylate and stearyl acrylate and $C_{1-18}$ alkyl methacrylats such as methyl methacrylate, ethyl methacrylate, butyl methacrylate, t-butyl methacrylate and 2-ethylhexyl methacrylate.

Examples of alkyl vinyl ether include $C_{1-18}$ alkyl vinyl ethers such as methyl vinyl ether, ethyl vinyl ether, propyl vinyl ether and stearyl vinyl ether. Examples of alkyl vinyl ester include $C_{1-18}$ alkyl vinyl esters such as vinyl acetate, vinyl propionate and vinyl butyrate.

The silicone-containing polymer UV absorbent can be prepared by conventional polymerization methods such as a solution polymerization method, a suspension polymerization method and an emulsion polymerization method. For example, when it is prepared by a solution polymerization method, monomer components of (A) UV absorbing monomer, (B) silicone macromer, (C) functional group-containing copolymerizable vinyl in monomer and (D) functional group non-containing copolymerizable vinyl compound are added to an organic solvent(s) and polymerization is performed in the presence of a polymerization initiator. The polymerization initiator is not limited.

The content of the silicone-containing polymer UV absorbent to polyorganosiloxane in the compositions is 0.5 to 10% by weight and preferably 1 to 5% by weight and more preferably 3 to 5% by weight. The content in the above-mentioned range does not exert influence on linear expansion coefficient of the cured layer.

The dispersion solvent can be used in the range not to impair the advantageous effects of the present invention. As the dispersion solvent, it is preferable to use water, low alcohols such as methanol, ethanol, isopropanol, n-butanol and isobutanol or ketones such as methylethylketone and diacetylketone. In order to develop the above-mentioned advantageous effects of solvent in the present invention, it is preferable to maintain water content in the corn position to 15% or below. When it is above 15%, stability of silanol group is deteriorated since water is selectively coordinated to silanol group.

The preservation temperature of the composition comprising polyorganosiloxane obtained herein is usually 25° C. or below, preferably 15° C. or below and more preferably 5° C. or below. When it is above 25° C., it is not preferable since hydrolysis and condensation reaction gradually proceed in a long time preservation.

Known cure catalyst, metal oxides and other additives may be properly added in the formation of a cured film with the composition comprising polyorganosiloxane of the present invention in order to improve hardness and abrasion resistance of the cured film and provide optical functions such as high refractive index.

Examples of cure catalyst include basic compounds such as lithium hydroxide, sodium hydroxide, potassium hydroxide, sodium methylate, sodium acetate, potassium acetate, sodium formate, potassium formate, n-hexylamine, potassium propionate, tributylamine and diazabicycloundecene, metal compounds such as tetraisopropyltitanate, tetrabutyltitanate, aluminum triisobutaoxide, aluminum triisopropoxide, γ-aminopropyltrimethoxysilane, aluminum acetylacetonate aluminum perchlorate, aluminum chloride, cobalt octylate, cobalt acetylacetonate, iron acetylacetonate, tin acetylacetonate and dibutoxy tinoctylate, acidic compounds such as p-toluene sulfonate and trichloro acetate. It is preferable that the amount of the cure catalyst is 0.01 to 10 parts by weight to 100 parts by weight of the composition comprising polyorganosiloxane.

Examples of metal oxide include silica, alumina, titanium oxide, cerium oxide, tin oxide, zirconium oxide, antimony oxide and iron oxide. Particularly, when it is used as a curing coating intended abrasion resistance, colloidal silica (silica sol) is preferable. When metal oxide is used as a curing coating, its amount is 5 to 500 parts by weight and preferably 10 to 200 parts by weight to 100 parts by weight of polyorganosiloxane resin. Condensation reaction may be performed in the presence of metal oxide or it may be added after condensation reaction.

The methods for coating the composition comprising polyorganosiloxane include brushing, rolling, dipping, flow coating, spraying, roll coater, flow coater, centrifugal coater, ultrasonic coater, screen process, electrolytic deposition coating and vapor deposition coating, depending on their purpose.

The acrylic resin layer positioned between the polycarbonate resin base material and the cured layer of the composition comprising polyorganosiloxane will be described in detail below.

It is preferable that an acrylic resin in the acrylic resin layer contains 80 mol % or above and preferably 80 to 99 mol % of a monomer of methylmethacrylate structural unit to total monomers of all structural units and has a weight average molecular weight of 70000 to 150000. When the acrylic resin is a homopolymer of methylmethacrylate, its heat stability is poor. In the above-mentioned range of the structural unit amount of methylmethacrylate and weight average molecular weight, the linear expansion coefficient is in the range of $5 \times 10^{-5}/° C.$ to $9 \times 10^{-5}/° C.$ The larger the structural unit monomer amount of methylmethacrylate is, the small the linear expansion coefficient of acrylic resin layer becomes. It is possible to make small both the difference of linear expansion coefficient between the polycarbonate resin base material and the acrylic resin layer and the difference of linear expansion coefficient between the cured layer and the acrylic resin layer and to maintain it within the range of the present invention, considering the structural unit monomer amount of methylmethacrylate in the acrylic resin and its weight average molecular weight.

It is preferable that the acrylic resin comprises methylmethacrylate unit as main component and the acrylic resin is a copolymer of methylmethacrylate with methylacrylate, ethylacrylate or butylacrylate. It is preferable to mold a polycarbonate resin and an acrylic resin by coextrusion. The heat deformation temperature is 90° C. or above, preferably 95° C. or above and more preferably 100° C. or above since when heat resistance of an acrylic resin is deteriorated, problems such as scorching and heat decomposition are caused during coextrusion molding.

The process for producing an acrylic resin is generally classified mainly into a process for emulsion polymerization process, a suspension polymerization process and a homogeneous polymerization process. It is preferable that the acrylic resin to be used in the present invention is an acrylic resin used by a homogeneous polymerization process. The homogeneous polymerization process is further classified into a continuous bulk polymerization process and a continuous solution polymerization process. In the present invention, an acrylic resin obtained by either one of the processes can be used.

In the emulsion polymerization process and the suspension polymerization process, an emulsifier or a suspension dispersant is used during polymerization reaction. After the completion of the polymerization reaction, these additives are removed by washing in water washing step. It is difficult to remove completely them. For example, In the appearance of a laminated sheet produced by coextrusion of an acrylic resin (Parapet HR-L) manufactured by suspension polymerization and a polycarbonate resin, occurrence of a large amount of eruptions and stripes was observed. As a result of analysis of microscopic IR for these eruptions, it was assumed that they were generated due to a suspension dispersant mixed therein in a small amount since its IR chart was an IR chart different from both the acrylic resin and the polycarbonate resin. The stripes were present in an interface between the acrylic resin layer and the polycarbonate resin layer and observed as foreign substances due to difference of refractive index. It was considered that the stripes occurred from the eruptions in a dye head as a base point.

On the other hand, in the continuous bulk polymerization process or in the continuous solution polymerization process, no the above-mentioned additives are used. A polymerization initiator and a chain transfer agent to adjust molecular weight are merely added. In the continuous solution polymerization process, examples of solvent include toluene, ethylbenzene, xylene, hexane, octane, cyclohexane, methanol, ethanol, propanol, butanol, acetone and methylethyl ketone, to which the present invention is not limited in the present invention. The solvent which can carry out effectively the polymerization reaction and does not remain in obtained acrylic resin may be used.

As the polymerization initiator, conventional azo polymerization initiators or peroxide polymerization initiators are effectively selected. Various polymerization initiators described in catalogues of NOF Corporation, Wako Pure Chemical Industries, Ltd., and Kayaku Akzo, K. K., in Japan can be used.

Examples of azo polymerization initiators include 2,2'-azobisisobutyronitrile, 2,2'-azobis(2-methylbutyronitrile) and 1-1'-azobis(cyclohexane-1-carbonitrile) and examples of peroxide polymerization initiators include benzoyl peroxide, di-t-butyl peroxide and di-t-amyl peroxide, to which the present invention is not limited.

As the chain transfer agent, mercaptans are usually used. Various mercaptans described in the catalogues of Kao Corporation and NOF Corporation, in Japan can be used, Examples of mercaptans include butyl mercaptan, hexyl mercaptan, octyl mercaptan and dodecyl mercaptan, to which the present invention is not limited.

These polymerization initiators and chain transfer agents cause no problems of eruptions and stripes because they are present in an end(s) of an acrylic polymer. Decomposed substances of a polymerization initiator which did not bond on an end(s) of the polymer do not cause the above-mentioned problems because they are dissolved in the acrylic polymer. Unreacted mercaptans are about perfectly removed in a step for volatilizing unreacted monomers and solvents. Mercaptans remained in very small amount do not cause the above-mentioned problems because they are perfectly dissolved in the acrylic resin and the polycarbonate resin.

An UV absorbent(s) of 0.01 to 5% by weight, preferably 0.02 to 3.5% by weight and more preferably 0.05 to 3.0% by weight may be contained in the acrylic resin in order to maintain weather resistance for a long time. In its content of the above-mentioned range, the addition of UV absorbent exerts no influence on the linear expansion coefficient of the acrylic resin layer. Known antioxidants and color resisting agents in addition to UV absorbent may be added to the acrylic resin layer. When the amount of UV absorbent is below 0.01% by weight, satisfactory weather resistance is not exhibited. When it is above 5% by weight, not only further improvement of weather resistance cannot be expected, but also these additives cause bleeding-out, so that whitening is caused and failure of adhesion and deterioration of mechanical properties, particularly impact strength may occur.

Examples of UV absorbent to be added to the acrylic resin include UV absorbents of benzotriazoles, benzophenones, phenyl salicylates and triazines, which can maintain transparency of the acrylic resin layer.

Examples of benzotriazole UV absorbents include 2-(5-methyl-2-hydroxyphenyl)benzotriazole, 2-[2-hydroxy-3,5-bis(α,α-dimethylbenzil)phenyl]-2H-benzotrialzole, 2-(2'-hydroxy-5'-t-octylphenyl) benzotriazole and 2,2-methylenebis[4-(1,1,3,3,3-tetramethylenebutyl)-6-(2H-benzotriazole-2-yl)phenol.

Examples of benzophenone UV absorbents include 2-hydroxy-4-octoxybenzophenone, 2,4-dihydroxybenzophenone, 2-hydroxy-4-methoxy-4'-chlorobenzophenone, 2,2-dihydroxy-4-methoxy-benzophenone and 2,2-dihydroxy-4,4'-dimethoxy-bezophenone.

Example of phenyl salicylate UV absorbent includes p-t-butylphenyl salicylate.

Examples of triazine UV absorbents include 2,4-diphenyl-6-(2-hydroxy-4-methoxyphenyl)-1,3,5-triazine, 2-4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benziloxyphenyl)-1,3,5-triazine and 2,4-diphenyl-6-(2-hydroxy-4-butoxyethoxy)-1,3,5-triazine.

Further, generally obtainable antioxidant and color resisting agent are contained in the acrylic resin layer.

As antioxidants and color resisting agents to be added to the acrylic resin layer, various antioxidants and color resisting agents described in the catalogues of Ciba Specialty Chemicals K. K., Sumitomo Chemical Co., Ltd., and Asahi Denka Kogyo K. K., in Japan can be used.

Examples of antioxidants and color resisting agents include 2,6-di-t-butyl-4-methyl phenol, 2,2'-methylenebis (4-methyl-6-t-butylphenol), 2,2'-methylenebis(4-ethyl-6-t-butylphenol), 3,3',3",5,5',5"-hexa-t-butyl-a,a',a"-(mesitylene-2,4,6-tolyl)tri-p-cresol, ethylenebis (oxyethylene)bis[3-(5-t-butyl-4-hydroxy-m-tolyl) propionate], hexamethylenebis [3-(3,5-di-t-butyl-4-hydroxyphenyl)propionate], 2,6-di-t-butyl-4-[4,6-bis (octythio)-1,3,5-triazine-2-yl-amino]phenol, pentaerythritoltetrakis[3-(3,5-di-t-butyl-4-hydroxyphenyl) propionate], N,N'-hexane-1,6-diyl-bis[3-(3,5-di-t-butyl-4-hydroxyphenylpropionamide)], 1,3,5-tris(3,5-di-t-butyl-4-hydroxybenzil)-1,3,5-triazine-2,4,6(1H,3H,5H)-trion, 1,3,5-tris[(4-t-butyl-3-hydroxy-2,6-xylyl)methyl]-1,3,5-trazine-2,4,6(1H,3H,5H)trion, diallyl-3,3'-thiodipropionate, pentaerythrityltetrakis (3-laurylthiopropionate), tris (nonylphenyl)phosphite, tris(dinonylphenyl)phosphite, 4,4'-thiobis(3-6-t-butylphenol), thiodiethylenebis[3-(3,5-di-t-butyl-4-hydroxyphenyl)propionate], trisnonylphenyl phosphite, triphenyl phosphite and tris(2,4-di-t-butylphenyl) phosphite and further PEP4C, PEP8, PEP24G, PEP36 and HP-10 described in the catalogue of Asahi Denka Kogyo K. K., in Japan, to which the present invention is not limited.

In the coextrusion of the polycarbonate resin and the acrylic resin, a lubricant to be added for the purposes of moldability with a feed black, a T-die and prevention of rolling in a polishing roll is 0.1 to 1% by weight, preferably 0.2 to 0.8% by weight and more preferably 0.2 to 0.7% by weight to the acrylic resin. When the amount of a lubricant is below 0.1% by weight, it does not contribute to improvement of adhesion to a roll, so that sufficient effect is not exhibited, whereas above 1% further improvement effect of mold ability is not exhibited, so that the lubricant causes bleeding out to deteriorate sometimes surface property of a laminate such as dust adhesion, and failure of adhesion to coating in the following step. As the lubricant to be added to the acrylic resin, various lubricants described in the catalogues of Kao Corporation, NOF Corporation, and Asahi Denka Kogyo K. K., in Japan can be applied. Examples of the lubricants include esters such as butylstearate, alcohols such as stearyl alcohol, glycerides such as stearic acid monoglyceride, sorbitans such as sorbitan monopalmitate and sorbitan monostearate, polyhydric alcohols such as mannitol, fatty acids such stearic acid, fat and oil type waxes such as cured castor oil, amides such as stearic acid amide and oleic acid amide, bisamides such as ethylenebis stearic acid amide and composite lubricants.

The film thickness of the acrylic resin layer produced by coextrusion is 1 to 100 μm, preferably 3 to 80 μm and more preferably 5 to 50 μm. When it is below 1 μm, the effect is not exhibited, whereas above 100 μm impact strength of a polycarbonate resin sometimes remarkably deteriorated and furthermore economy is disadvantageous.

An example of the process for producing the resin laminate of the present invention is described below.

An extruder to be used for production of the laminate generally comprises one main extruder to extrude a polycarbonate resin as the base material layer and at least one subextruder to extrude an acrylic resin as a coating layer. As the subextruder, a smaller type extruder than the main extruder is applied. The temperature conditions of the main extruder are usually 230 to 290° C. and preferably 240 to 280° C. The temperature conditions of the subextruder are usually 220 to 270° C. and preferably 230 to 260° C. As methods for coating two species or more of molten resin, known methods such as a feed block method and a multi-manifold die method can be applied. In this case, molten resins laminated by feed block are introduced to a sheet molding die such as T die and molded into a sheet form and then transferred to a molding roll (polishing roll) subjected to mirror treatment for its surface to form a bank. The sheet type molded article is subjected to mirror finishing and cooling while passing the molding roll, whereby a laminate is formed. In case of multimanifold die, molten resins laminated in the die are molded to a sheet form inside the die and then subjected to surface finishing and cooling in a molding roll, whereby a laminate is formed. The temperature of die is usually 220 to 280° C. and preferably 230 to 270° C. The temperature of molding roll is usually 100 to 190° C. and preferably 110 to 180° C. A longitudinal type roll or a horizontal type roll may be properly applied.

The most important feature of the resin laminate of the present invention is to make small the difference of linear expansion coefficient between each resin layer. In the present invention, the difference of linear expansion coefficient between the polycarbonate base material and the acrylic resin layer and the difference of linear expansion coefficient between the acrylic resin layer and the cured layer, are respectively 0/° C. to $5 \times 10^{-5}$/° C. and preferably respectively 0/° C. to $3 \times 10^{-5}$/° C. The small the difference of linear expansion between the polycarbonate resin base material and the acrylic resin layer and the difference of linear expansion coefficient between the acrylic resin layer and the cured layer is, the better adhesion between each layer can be maintained. Excellent weather resistance can be attained by maintaining good adhesion between each resin layer.

The linear expansion coefficient of each resin layer can be properly selected so as to satisfy the above-mentioned range of the difference of linear expansion coefficient between each resin layer in the present invention, considering the relation between molecular weight and linear expansion coefficient of a polycarbonate resin, the relation between monomer content of methylmethacrylate structural unit in an acrylic resin and linear expansion coefficient of an acrylic resin and the relation between amount of hexamer or more and average polymerization of polyorganosiloxane before curing and linear expansion coefficient of polyorganosiloxane.

When the resin laminate has a thickness of 1 mm or below, it is installed to at least one mold of an injection molder so as to face its cured layer to the surface of the mold and another polycarbonate resin is injected in a cavity of the mold and cooled, whereby molding is performed.

When the resin laminate has a thickness of 3 mm or above, molding is performed by bending.

The molded thus obtained are applied mainly to window glasses and sun roofs for car.

PREFERRED EMBODIMENT OF THE INVENTION

The present invention will be described in more detail below, referring to Examples, which are not intended to limit the scope of the present invention, Further, the word "part" means "part by weight" and the word "%" means "% by weight" except particular designation.

The evaluation method and the test method used in Examples and Comparative Examples are shown below.

Method for Measurement of Linear Expansion Coefficient

The measurement was performed according to JIS K7197. A sample (1 mm or above×1 mm or above×100 μm to 5 mm) was placed on a quartz board and a cylindrical rod of cross section area 0.53 mm² was placed thereon. The temperature was raised at the rate of 10° C./min. Thus, the measurement was performed.

(Preparation of Polyorganosiloxane Sample)

3 g of a composition comprising polyorganosiloxane was weighed in an aluminum cup and standing on a hot plate of about 45° C. for 2 hours to remove volatile components. Then, curing was performed in a dryer of 125° C. for 2 hours and then cured product thus obtained was peeled off from the aluminum cup, whereby the sample of about 3 mm×about 3 mm×thickness about 100 μm was prepared.

(Preparation of Polycarbonate Resin Sample)

A polycarbonate resin sheet of thickness 5 mm was cut into the size of about 3 mm×about 3 mm and cut surfaces was smoothed with a cutter knife, whereby the sample was prepared.

(Preparation of Acrylic Resin Sample)

Both cross sections of a polymethylmethachylate pellet of about φ 3 mm×about 5 mm was microtome cut to chamfer, whereby the sample was prepared.

| | |
|---|---|
| Analysis apparatus: | TMA 100 manufactured by Seiko Denshi Kogyo K.K., in Japan |
| Temperature Conditions: | 30 to 190° C., raising temperature at 10° C./min |
| Load: | 1 g |
| Atmosphere: | N₂, 300 ml/min |

| | |
|---|---|
| -continued | |
| Measurement: | Data at rising temperature of 2 times or after was adopted since heat hysteresis was cancelled in one times. The measurement was repeated 5 times and an average value in the temperature of 60 to 90° C. was determined. |

Method for Measurement of GPC of Composition Comprising Polyorganosiloxane

Volatile components comprising water as main component and organic solvents such as alcohols and acetylacetone were removed from 5 g of a composition solution comprising polyorganosiloxane in an ice bath under a reduced pressure of 10 mmHg or below. Then, the composition thus removed volatile components was dissolved in THF to prepare a solution of 0.1% concentration and then passed through a membrane filter of 0.1 μm, and then GPC analysis was performed.

| | |
|---|---|
| Analysis conditions: | apparatus Shodex system 21 Manufactured by Showa Denko K.K., in Japan |
| Column (for a low molecular weight): | KF-803L × 1 + KF-802.5 × 1 + KF-801 × 2 |
| Sample concentration: | 0.1 % THF |
| Transfer layer: | THF |
| Oven temperature: | 40 ° C. |
| Calibration curve: | monodispersion polystyrene standard substance |

Method for Measurement of GPC of Polymer UV Absorbent

A polymer UV absorbent was dissolved in THF to prepare a solution of 0.2% concentration and then passed through a membrane filter of 0.1 μm and then GPC analysis was performed.

Column: [TSKGel GMHXL]×2+[TSKGel G2000HXL] ×1, manufactured by Toso k. k., in Japan Transfer layer: THF Sample concentration: 0.1% THF Oven temperature: 40° C.

Detector: [UV-8000] manufactured by Tosoh Corporation, in Japan

Method for Measurement of GPC of Resin

An acrylic resin or a polycarbonate resin was dissolved in THF to prepare a solution of concentration 0.3% and then passed through a membrane filter of 0.1 μm and then GPC analysis was performed.

The measurement was performed using polystyrene as a standard polymer by GPC apparatus, manufactured by Waters Co.(column: Ultrastalizel 10⁵+10⁴+10³+500 Å, manufactured by Waters Co.). Then, a weight average molecular weight was determined from a calibration curve determined the relation between dissolution time and molecular weight of acrylic resin or polycarbonate resin by a universal calibration method.

Weather Resistance

The test was conducted in a cycle of light irradiation for 5 hours (UV intensity 50 mW/cm², black panel temperature 63° C. and humidity 50%) and dewing for one hour (temperature 30° C. or above and humidity 100%) with a super UV tester, manufactured by Iwasaki Denki K. K., in Japan and furthermore showering was performed for 10 seconds every 10 minutes during light irradiation. The change of appearance such as crack and natural peeling at each time was observed. "No change" was judged as "passed".

Taber Abrasion

Haze under a load of 500 g after 500 rotation measured with Taber abrasion tester in stalled abrasion ring CS-10F according to ASTM 1044. The value (ΔH %) deducted a value prior to testing was indicated.

Initial Adhesion

According to JIS K5400, each six longitudinal and horizontal rifts in 2 mm interval were inserted into a sample with a razor edge to make 25 cross hatch squares and then sufficiently adhered to a commercial cellophane tape. When the cellophane tape was suddenly peeled off to this side of 90 degree, the number of square remained with out being peeled off was represented by X/25.

Optical Property/Haze

The measurement was performed by a hazemeter 80-NDH, manufactured by Nihon Denshoku Kogyo K. K., in Japan.

Boiling Resistance

A sample was immersed in a boiling water of 100° C. for 2 hours and then change of appearance and adhesion were evaluated.

Heat Resistance

A sample was standing in hot wind circulation dryer of 130° C. for one hour and then change of appearance and adhesion were evaluated.

SYNTHESIS EXAMPLE 1

(Synthesis of Polyorganosiloxane)

272 parts of methyltrimethoxysilane and 160 parts of methanol were added to a reactor, equipped with a stirrer and a reflux condenser and ice cooled to maintain to 10° C. or below under nitrogen atmosphere. Then, 400 parts of a 0.1% acetic acid solution was dropwise added thereto over 40 minutes to hydrolyze alkoxysilane. After the completion of dropwise addition, the reaction was continued under ice cooling for one hour and then stirring was performed at a room temperature for 3 hours, thus completing the hydrolysis.

200 parts of methanol silica sol (particle diameter 15 μm, silica solid matter 30%) and 600 parts of isopropanol were added to the silanol solution thus obtained and then stripping was conducted under a reduced pressure of 20 to 50 mmHg at an interior temperature of 35° C. or below to remove methanol and remained water. Finally obtained polyorganosiloxane solution (non-volatile matter 20%) was 650 parts. Further, condensation reaction was gradually carried out in this reaction solution at 40° C. for 7 days in a dark place. GPC analysis of the polyorganosiloxane solution (H1) was performed. It did not contain both monomer and dimmer and contained 0.01% of trimer, 9.9% of tetramer, 11.4% of pentamer and 78.7% of hexamer or more and its number average polymerization degree was 10.8. It is considered that each molecule were linked in a straight state during this oligomerization reaction. This solution was cured at 125° C. for 2 hours. The cured product thus obtained had a linear expansion coefficient of $10.0 \times 10^{-5}$/° C. at 60 to 90° C.

SYNTHESIS EXAMPLE 2

(Synthesis of Acrylic Primer)

100 parts of diacetone alcohol was added to a reactor equipped with a stirrer, a reflux condenser, a nitrogen gas introducing pipe and a dropping funnel and the reactor interior was sufficiently replaced with a nitrogen gas under stirring and heated to 80 to 90° C. 20 parts of triinethhoxypropylmethacrylate, 60 parts of methylinethacrylate, 5 parts of methylacrylate, 5 parts of vinyl acetate, 10 parts of glycidylmethacrylate, 0.2 parts of ethyleneglycol dimethacrylate and 3 parts of azobisisobutyronitrile (AIBN) as initiator in the dropping funnel were gradually added to the reactor over one hour. Meantime, stirring and introduction of a nitrogen gas were continued. Then, the reaction was continued at 90° C. for 3 hours and completed. 20 parts of polymethylmethacrylate having a weight average molecular weight (Mw) of 150000, 150 parts of methylisobutylketone, 150 parts of cellosolve acetate, 110 parts of propyleneglycol monomethylether, 110 parts of isopropanol and 50 parts of diacetone alchol as solvents were added thereto and non-volatile matter was prepared to 15%. 2% of 2,2'-dihydroxybenzophenone as a UV absorbent to the non-volatile matter was added to the reaction solution, whereby a primer coating composition was obtained. This composition solution was cured at 125° C. for 2 hours to obtain a cured product. The linear expansion coefficient at 60 to 90° C. of the cured product thus obtained was $24.0 \times 10^{-5}$/° C.

SYNTHESIS EXAMPLE 3

(Synthesis of Polymer UV Absorbent)

40 g of 2-hydroxy-4-methacryloyloxybenzophenone as (A) UV absorbing monomer, 60 g of silicone macromer, trade name "Sairaplene FM-0711", in manufactured by Chisso Corporation, in Japan, weight average molecular weight 1000 as (B) silicone macromer, 80 g of 2-hydroxyethylmethacrylate as (C) functional group-containing vinyl monomer (hereinafter, sometimes referred to "(C) functional group-containing vinyl monomer"), 20 g of methylmethacrylate as (D) functional group non-containing vinyl monomer (hereinafter, referred to as "(D) functional group-non containing vinyl monomer"), 2 g of n-dodecylmercaptan as a chain transfer agent and 200 g of methylethyl ketone as an organic solvent were added to a separable flask of 1 L, equipped with a Dimroth condenser, a dropping funnel, a thermometer, a nitrogen introducing pipe and a stirrer and its interior temperature was raised to 50° C. while injecting nitrogen from the nitrogen introducing pipe. Then, 1.0 g of azobisisobutyronitrile dissolved a small amount of methylethylketone was dropwise added over 30 minutes. After the completion of the drop wise addition, its interior temperature was raised to 70° C. and the reaction was performed for 8 hours, whereby a silicone-containing polymer UV absorbent was prepared. GPC analysis of the silicone-containing polymer UV absorbent was performed and its weight average molecular weight was 20,000.

PRODUCTION EXAMPLE 1

(Acrylic Resin MGC-10, the Process Described in Japanese Patent Kokai(Laid-open)No. 7-133303)

88 parts of methylmethacrylate, 4 parts of methylacrylate, 8 parts of methanol, 0.032 parts ($2 \times 10^{-3}$ mol/L) of di-t- butylperoxide and 0.21 parts ($2\times10^{-3}$ mol/L) of n-dodecylmercaptan were mixed and then dissolved oxygen was removed by nitrogen injection, whereby a raw material liquid was prepared. 5 kg of the raw material liquid was preliminarily added to a polymerization vessel of inner capacity 6 L, equipped with a jacket to circulate a hot medium and a helical ribbon stirring blade to close hermetically and its interior temperature was raised to 150° C. while maintaining a uniform mixing state with sufficient stirring and polymerization was performed.

When the polymerization temperature and average residence time were maintained to 150° C. and about 5 hours, respectively, polymerization liquid viscosity 45 Pa·sec, monomer conversion 75% and polymer concentration 69% were stably maintained. The polymerization liquid was withdrawn at the rate of 1 kg/h and heated to 250° C. and then flushed in a volatilizing tank set under a reduced pressure. The deaerated polymer was withdrawn in a molten state from the bottom section of the de aerator tank and taken out in a strand state with dies and water cooled and then pelletized with a pelletizer. The pellet thus obtained contained 0.27% of methylmethacrylate and 0.01% of methylacrylate as remained volatile matters and did not contain the polymerization initiator and n-dodecylmercaptan by GC analysis. The appearance of the pellet thus obtained was colorless and transparent. The pellet had weight average molecular weight (Mw) 103,000 and heat distortion temperature 105° C. and linear expansion coefficient $8.0\times10^{-5}$/° C. at 60 to 90° C.

PRODUCTION EXAMPLE 2
(Production of Coextrusion Sheet)

A polycarbonate resin, E-2000U, manufactured by Mitsubishi Gas Chemical Co., Inc., having a weight average molecular weight of 35500 was used as a base material layer. An extruder to extrude the polycarbonate resin was set to barrel diameter 65 mm, 35(L/D) of screw length and cylinder temperature 270° C. An extruder to extrude the acrylic resin to form a coating layer was set to barrel diameter 32 mm, 32 (L/D) of screw length and cylinder temperature 250° C. Two species of resin were melt extruded together simultaneously. In the lamination, the acrylic resin was laminated on one side surface of the polycarbonate resin with a feed block of width 500 mm. The interior temperature of die head was set to 260° C. The resins laminated in the die were introduced to three polishing rolls subject to mirror finishing and the roll temperature was set to 110° C. at first roll, 180° C. at second roll and 180° C. at third roll. In the roll interval to be flowed in initially, a bank was formed and then passed through second roll and third roll. The pulling speed was set to 1.2 m/min and the pinch roll speed for pulling was set to 1.6 m/sec. The sheet thus obtained had a thickness of 0.9 mm and the acrylic coated layer had thickness of 20 μm and its appearance was good.

The acrylic resin used herein was a resin added 2% of Tinuvin 1577, manufactured by Ciba Specialty Chemicals K. K., in Japan as a UV absorbent, 0.1% of Sumilizer BHT, manufactured by Sumitomo Chemical. Co., Ltd., in Japan and 0.05% of Adekastabu PEP-36, manufactured by Asahi Denka Kogyo K. K., in Japan as antioxdants and 0.4% of stearyl alcohol as a lubricant to the acrylic resin (Production Example 1), MGC-10, manufactured by Mitsubishi Gas Chemical Co., Inc., produced by the continuous polymerization process.

Each linear expansion coefficient of polycarbonate, three species of polymethylmethacrylate, polyorganosiloxane of Synthesis Example 1 after curing, methacrylic primer of Synthesis Example 2 after curing was measured. The results were shown in Table 1.

PRODUCTION EXAMPLE 3
(Production of Coextrusion Sheet)

The sheet was formed in the same apparatus and production conditions as in Production Example 2. The acrylic resin used herein was Atoglass V020, manufactured by Atofina in a continuous solution (toluene) polymerization process. The sheet thus produced had no eruption, no stripe and no foam and its appearance was good.

PRODUCTION EXAMPLE 4
(Production of Coextrusion Sheet)

The coextrusion sheet was produced in the same manner as in Production Example 3 except that the acrylic resin was changed from Atoglass V020 produced by a continuous polymerization to extruded pellets passed through a screen of 5 μm Parapet HR-L, (manufactured by Kuraray Co., Ltd., in Japan) produced by a suspension polymerization process. The sheet thus produced had no eruption, no stripe and no foam and its appearance was good.

EXAMPLE 1

1 g of the polymer UV absorbent of Synthesis Example 3 was added to 150 g of the polyorganosiloxane solution (non-volatile matter 20%) preliminarily produced in Synthesis Example 1 and mixed. The mixture thus obtained (hereinafter, referred to as "polymer UV absorbent-containing polyorganosiloxane sokution A") was coated on the acrylic resin side of the polycarbonate resin/acrylic resin sheet of 500 mm×1000 mm×thickness 0.9 mm and acrylic layer thickness 20 μm, produced in Production Example 2 and naturally dried at a room temperature for 20 minutes and then cured at 130° C. for one hour. The evaluation of the coating including appearance, optical property/haze, abrasion resistance, adhesion (cross hatch test), he at resistance and boiling resistance and weather resistance test were performed. The results were shown in Table 2. The resin laminate sheet exhibited good appearance and excellent weather resistance.

COMPARATIVE EXAMPLE 1

The extruded sheet was prepared by extruding a polycarbonate resin, E-2000U, manufactured by Mitsubishi Gas Chemical Co., Inc., having a weight average molecular weight of 35500 with an extruder of barrel diameter 65 mm, 35 (L/D) of screw length, and cylinder temperature 270° C. using a flat die of width 500 mm. The flat die head interior temperature was set to 260° C. The extruded sheet thus obtained was introduced into three polishing rolls subjected to mirror finishing, which were set to first roll temperature 110° C. second roll temperature 180° C. and third roll temperature 180° C. In the roll interval to be introduced initially, a bank was formed and then it was passed through second roll and third roll. The pulling speed was 1.2 m/min and the pinch roll speed for pulling was set to 1.6 m/min. The thickness of a sheet thus obtained was 0.9 mm.

The acrylic primer prepared in Synthesis Example 2 was coated on the polycarbonate resin sheet cut into size of 500 mm×1000 mm and dried at a room temperature for 20 minutes and then cured at 125° C. for one hour. Then, polymer UV absorbent-containing polyorganosiloxane solution A was coated thereon and naturally dried at a room temperature for 20 minutes and then cured at 130° C. for one hour. The evaluation of the coating including appearance, optical property/haze, abrasion resistance, adhesion (cross hatch test), heat resistance and boiling resistance and weather resistance test were performed. The results were shown in Table 2. The resin laminate sheet exhibited good appearance, but its weather resistance was insufficient.

EXAMPLE 2

Polymer UV containing polyorganosiloxane solution A was coated on the acrylic resin side of the polycarbonate resin/acrylic resin sheet of 500 mm×1000 mm×thickness 0.9 mm and acrylic layer thickness 20 μm obtained in Production Example 3 and naturally dried at a room temperature for 20 minutes and cured at 130° C. for one hour. The evaluation of the coating including appearance, optical property/haze, abrasion resistance, adhesion (cross hatch test), heat resistance and boiling resistance and weather resistance test were performed. The results were shown in Table 2. The resin laminate sheet thus obtained exhibited excellent appearance and excellent weather resistance.

EXAMPLE 3

Polymer UV absorbent-containing polyorganosiloxane solution A was coated on the acrylic resin side of the polycarbonate resin/acrylic resin sheet of 500 mm×1000 mm×thickness 0.9 mm and acrylic layer thickness 20 μm obtained in Production Example 4 and naturally dried at a room temperature for 20 minutes and cured at 130° C. for one hour. The evaluation of the coating including appearance, optical property/haze, abrasion resistance, adhesion (cross hatch test), heat resistance and boiling resistance and weather resistance test were performed. The results were shown in Table 2. The resin laminate sheet thus obtained exhibited excellent appearance and excellent weather resistance.

COMPARATIVE EXAMPLE 2

The polyorganosiloxane solution prepared in Synthesis Example 1 was coated on the acrylic resin side of the polycarbonate resin/acrylic resin sheet of 500 mm×1000 mm×thickness 0.9 mm and acrylic layer thickness 20 μm obtained in Production Example 2 and cured at a room temperature for 20 minutes and cured at 130° C. for one hour. The evaluation of the coating including appearance, optical property/haze, abrasion resistance, adhesion (cross hatch test), heat resistance and boiling resistance and weather resistance test were performed. The results were shown in Table 2. The resin laminate sheet exhibited good appearance, but its weather resistance was inferior to that of case wherein a polymer UV absorbent was added to a polyorganosiloxane solution.

EXAMPLE 4

The resin laminate sheet obtained in Example 1 was cut in to the size of a mold of average thickness 5 mm and outer size 800 mm×400 mm for injection molding of triangular window glass for car and installed so as to face the polyorganosioxane cured layer of the resin laminate sheet to the mold. Another polycarbonate resin was injected into a cavity of the mold at a cylinder temperature of 280° C. under an injection pressure of 1600 kg/cm$^2$ and cooled at a mold temperature of 60° C., whereby a molded article for triangular window glass of car was obtained.

EXAMPLE 5

The polyorganosiloxane solution (non-volatile matter 20%) prepared in Synthesis Example 1 was coated on the acrylic resin side of the polycarbonate resin/acrylic resin sheet of 500 mm×1000 mm×thickness 6.0 mm and acrylic layer thickness 20 μm produced in the same manner as in Production Example 3 and naturally dried at a room temperature for 20 minutes and then cured at 130° C. for one hour. The sheet thus obtained was cut into the size of 450 mm×900 mm for rear window of car and then heated in a mold at 160° C. for 3 minutes so as for the polyorganosiloxane layer of the resin laminate to form a convex surface and locked at the rate of 5 mm/min. The bending was completed under a pressure of 10 kg/cm$^2$, whereby a rear window for car was obtained.

In the transparent resin laminate of the present invention, a polycarbonate resin base material and an acrylic resin comprising a UV absorbent are mold into a film, a sheet or a board by a coextrusion method and a composition comprising polyorganosiloxane is coated on the acrylic resin layer and cured and furthermore each difference of linear expansion coefficient between the polycarbonate resin base material and the acrylic resin and between the acrylic resin and the cured layer of the composition comprising UV absorbent is made small, whereby refreshing finished resin laminate with good adhesion between the polycarbonate resin base material and the acrylic resin layer or between the acrylic resin and the cured layer, excellent weather resistance, abrasion resistance, heat resistance and water resistance, having a coating with high gloss can be obtained.

TABLE 1

| Resin | Grade (Production Maker) | Linear Expansion coefficient (60 ~ 90 ° C.) (×10$^{-5}$° C.) |
|---|---|---|
| Polycarbonate | E-2000U (Mitsubishi Gas Chemical Co. Inc.) | 7.5 |
| Polymethylmethacrylate | MGC-10 (Mitsubishi Gas Chemical Co. Inc.) | 8 |
| Polymethylmethacrylate | Atoglass V020 (Atofina) | 8 |
| Polymethylmethacrylate | Parapet HR-L (Kuraray Co., Ltd) | 8.3 |
| Polyorganosiloxane | Synthesis Example 1 | 10 |
| Methacrylic primer | Synthesis Example 2 | 24 |

TABLE 2

|  | Example 1 | Example 2 | Example 3 | Comp.Ex. 1 | Comp.Ex. 2 |
|---|---|---|---|---|---|
| Difference of linear expansion coefficient (× 10$^{-5}$/° C.) between cured layer and acrylic resin | 1.7 | 2 | 2 | 14 | 1.7 |
| Difference of linear expansion coefficient (× 10$^{-5}$/° C.) between acrylic resin and polycarbonate resin | 0.8 | 0.5 | 0.5 | 16.5 | 0.5 |
| Thickness of acrylic resin layer (μm) | 20 | 20 | 20 | 7 | 20 |
| Thickness of cured layer (μm) | 4 | 4 | 4 | 5 | 4 |
| Appearance after curing | good | good | good | good | good |
| Initial adhesion | 25/25 | 25/25 | 25/25 | 25/25 | 25/25 |

TABLE 2-continued

|  | Example 1 | Example 2 | Example 3 | Comp.Ex. 1 | Comp.Ex. 2 |
|---|---|---|---|---|---|
| Appearance after boiling | good | good | good | good | good |
| Adhesion after boiling | 25/25 | 25/25 | 25/25 | 25/25 | 25/25 |
| Weather resistance |  |  |  |  |  |
| 200 hr | passed | passed | passed | passed | passed |
| 300 hr | passed | passed | passed | passed | passed |
| 400 hr | passed | passed | passed | crack | passed |
| 500 hr | passed | passed | passed | peel-off | passed |
| 600 hr | passed | passed | passed | — | crack |
| 1,000 hr | passed | passed | passed | — | peel-off |

What is claimed is:

1. A transparent resin laminate comprising a polycarbonate resin base material, an acrylic resin layer comprising an ultraviolet absorbent coated on at least one surface of said polycarbonate resin base material and a cured layer formed by coating a composition comprising polyorganosiloxane and a silicone-containing polymer ultraviolet absorbent on said acrylic resin layer and then curing, wherein a difference of linear expansion coefficient between said polycarbonate resin base material and said acrylic resin layer and a difference of linear expansion coefficient between said acrylic resin layer and said cured layer are $0/°$ C. to $5 \times 10^{-5}/°$ C., respectively.

2. The transparent resin laminate according to claim 1, wherein said polycarbonate resin base material has a weight average molecular weight of 24000 to 53000 and a linear expansion coefficient of $6 \times 10^{-5}/°$ C. to $8 \times 10^{-5}/°$ C.

3. The transparent resin laminate according to claim 1, wherein said polycarbonate resin base material is a molded article, a film, a sheet or a board.

4. The transparent resin laminate according to claim 1, wherein said acrylic resin layer is an acrylic resin comprising methylmethacrylate as a main component.

5. The transparent resin laminate according to claim 1, wherein said acrylic resin layer is an acrylic resin of 80 mol % or above of monomer methyl methacrylate structural unit to total monomers of all structural units having a weight average molecular weight of 70000 to 150000 and a linear expansion coefficient of $5 \times 10^{-5}/°$ C. to $9 \times 10^{-5}/°$ C.

6. The transparent resin laminate according to claim 1, wherein said ultraviolet absorbent in said acrylic resin layer is one ultraviolet absorbent selected from the group consisting of benzotriazoles benzophenones, phenyl salicylates and triazines.

7. The transparent resin laminate according to claim 1, wherein a content of the ultraviolet absorbent in said acrylic resin layer is 0.01 to 5% by weight.

8. The transparent resin laminate according to claim 1, wherein said polycarbonate resin base material is molded together with said acrylic resin comprising an ultraviolet absorbent by a coextrusion method and a thickness of said acrylic resin layer is 1 to 100 μm.

9. The transparent resin laminate according to claim 1, wherein said polyorganosiloxane does not substantially contain monomer and dimer and contains 65% by weight or above of hexamer or more and has a number average polymerization degree of 8 to 30 and a linear expansion coefficient of the cured layer formed by curing polyorganosiloxane having said number average polymerization degree of $7 \times 10^{-5}/°$ C. to $15 \times 10^{-5}/°$ C.

10. The transparent resin laminate according to claim 1, wherein said silicone-containing polymer ultraviolet absorbent is a polymer obtained from (A) at least one ultraviolet absorbing monomer selected from the group consisting of benzophenone ultraviolet absorbing monomers represented by the following formula (1) and benzotriazole ultraviolet absorbing monomers represented by the following formula (2), (B) silicone macromer represented by the following formula (3), (C) functional group containing copolymerizable vinyl monomer and (D) functional group-non containing copolymerizable vinyl compound and has a weight average molecular weight of 10,000 to 100,000;

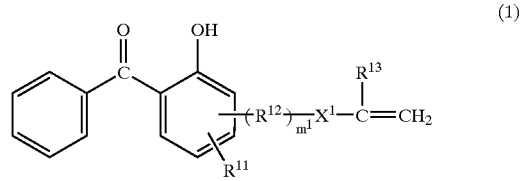

(1)

wherein $R^{11}$ is a hydrogen atom, an alkyl group having 1 to 6 carbon atoms or an alkoxy group having 1 to 6 carbon atoms; $R^{12}$ is an alkylene group having 1 to 10 carbon atoms or an oxyalkylene group having 1 to 10 carbon atoms and $m^1$ is 0 or 1; $R^{13}$ is a hydrogen atom or a low alkyl group and $X^1$ is an ester bond, an amide bond, an ether bond or an urethane bond;

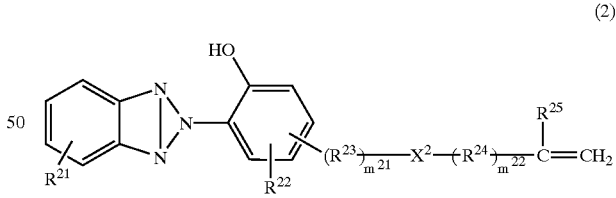

(2)

wherein $R^{21}$ is a hydrogen atom, a halogen atom or a methyl group; $R^{22}$ is a hydrogen atom or a hydrocarbon group having 1 to 6 carbon atoms; $R^{23}$ is an alkylene group having 1 to 10 carbon atoms or an oxyalkylene group having 1 to 10 carbon atoms and $m^{21}$ is 0 or 1; $R^{24}$ is an alkylene group having 1 to 8 carbon atoms or an alkylene group with an amino group having 1 to 8 carbon atoms or an alkylene group with a hydroxyl group having 1 to 8 carbon atoms and $m^{22}$ is 0 or 1; $R^{25}$ is a hydrogen atom or a low alkyl group and $X^2$ is an ester bond, an amide bond, an ether bond or an urethane bond;

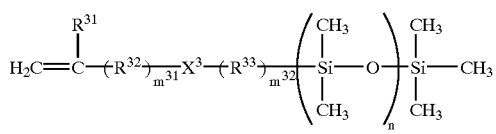

(3)

wherein $R^{31}$ is a hydrogen atom or a methyl group; $R^{32}$ is an alkylene group having 1 to 6 carbon atoms or an oxy alkylene group having 1 to 6 carbon atoms and $m^{31}$ is 0 or 1; $R^{33}$ is an alkylene group having 1 to 6 carbon atoms, an alkylene group with an amino group having 1 to 6 carbon atoms or an alkylene group with a hydroxyl group having 1 to 6 carbon atoms and $m^{32}$ is 0 or 1 and n is an integer of 1 to 200 and $X^3$ is an ester bond or an amide bond.

11. The transparent re sin laminate according to claim 1, wherein a weight average molecular weight of (B) silicone macromer is 200 to 10,0000.

12. The transparent resin laminate according to claim 1, wherein each proportion of (A) ultraviolet absorbing monomer, (B) silicone macromer, (C) functional group-containing copolymerizable vinyl monomer and (D) functional group-non containing copolymerizable vinyl compound to total amount of components (A), (B), (C) and (D) is (A)/(B)/(C)/(D)=5 to 50/5 to 60/50 to 80/5 to 20 (% by weight).

13. The transparent resin laminate according to claim 1, wherein said composition further contains colloidal silica.

14. A molded article for window glass and sun roof of car obtained by inserting the transparent resin laminate described in claim 1 into a mold of an injection molder and injecting another polycarbonate resin to its polycarbonate resin base material side and then injection molding to integrate.

15. A molded article for window glass and sun roof of car obtained by bending the transparent resin laminate of claim 1.

* * * * *